Dec. 1, 1953
J. H. KNOWLES
COTTON HARVESTER
2,660,849
Filed Aug. 25, 1950
5 Sheets-Sheet 1
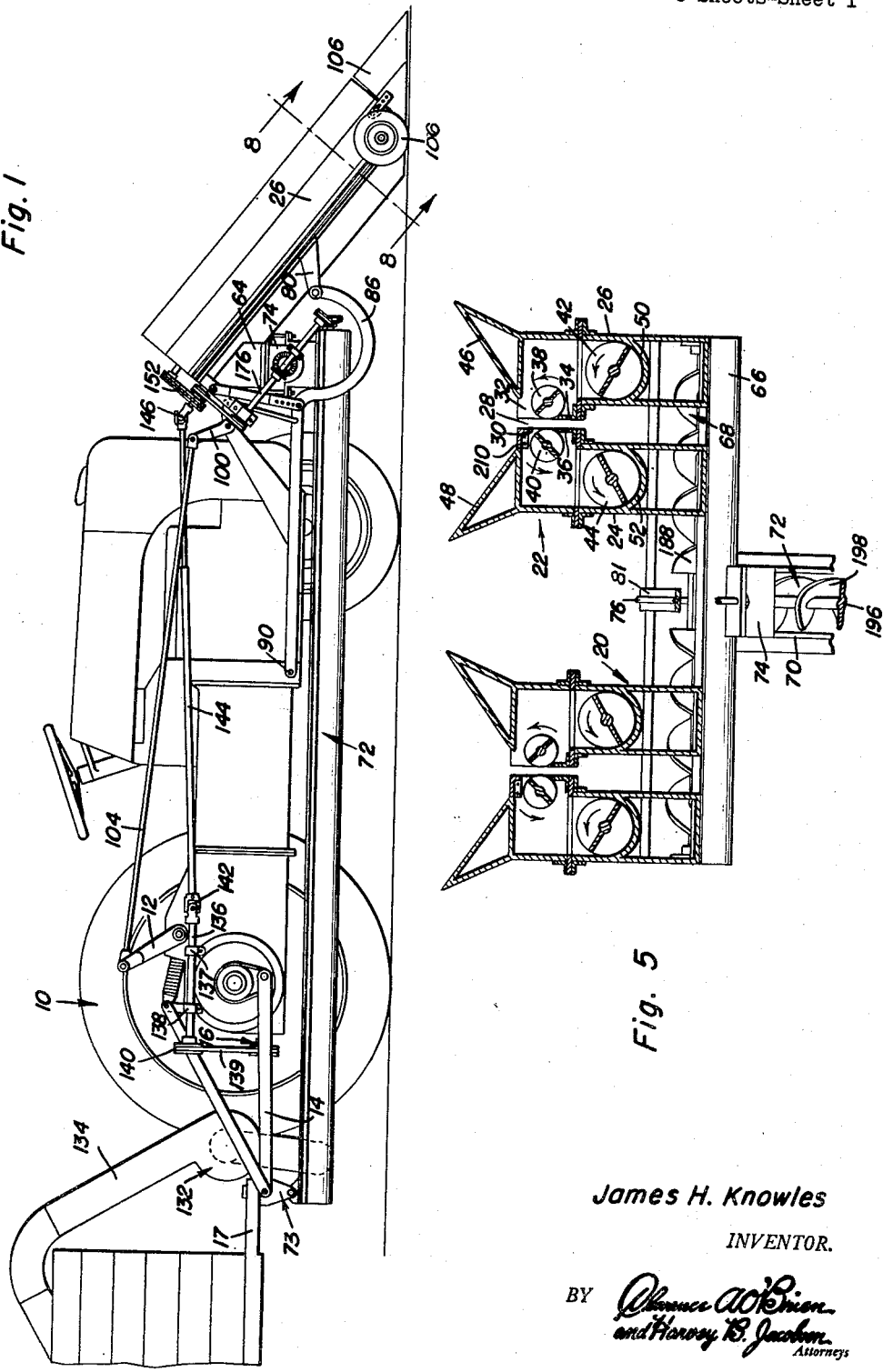
James H. Knowles
INVENTOR.
BY
Attorneys

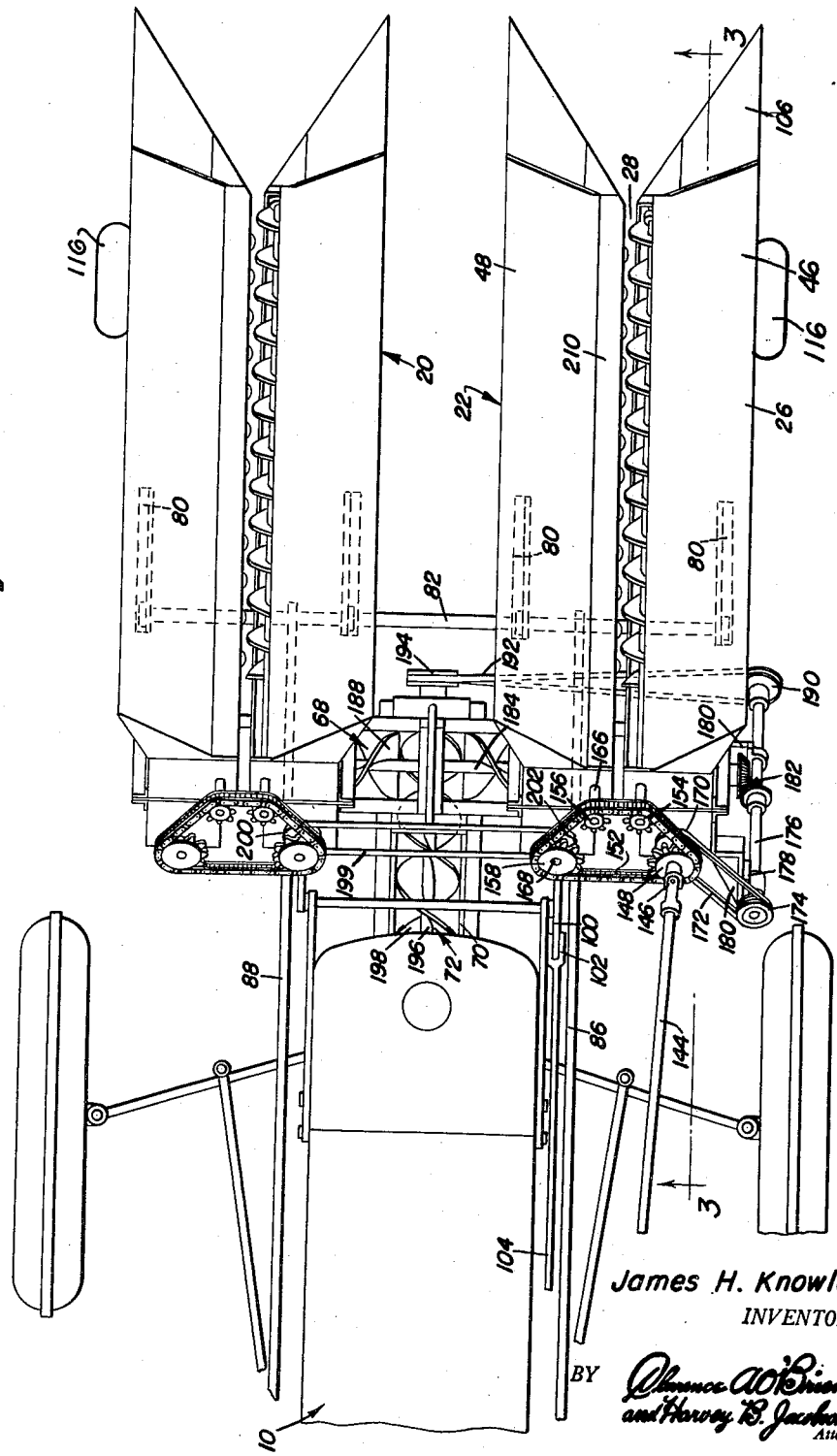

Dec. 1, 1953  J. H. KNOWLES  2,660,849
COTTON HARVESTER
Filed Aug. 25, 1950  5 Sheets-Sheet 3
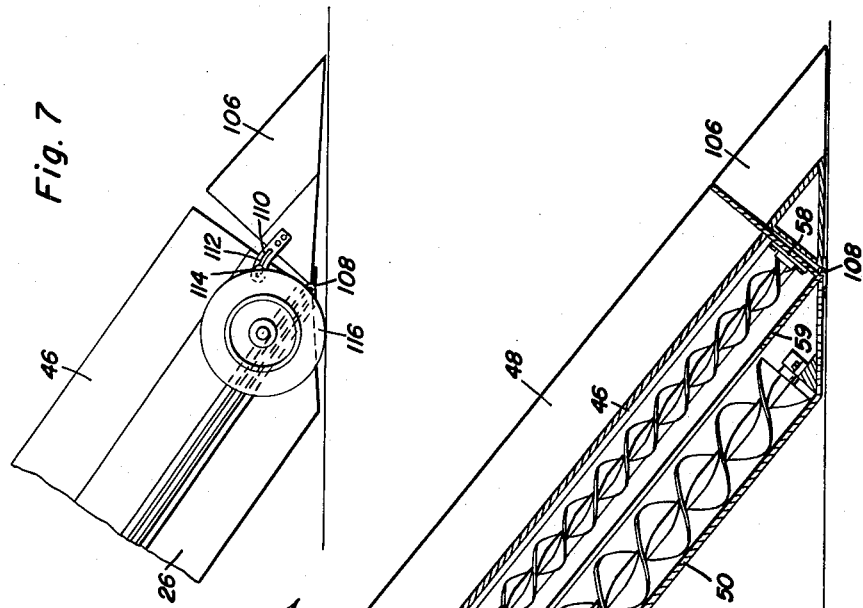
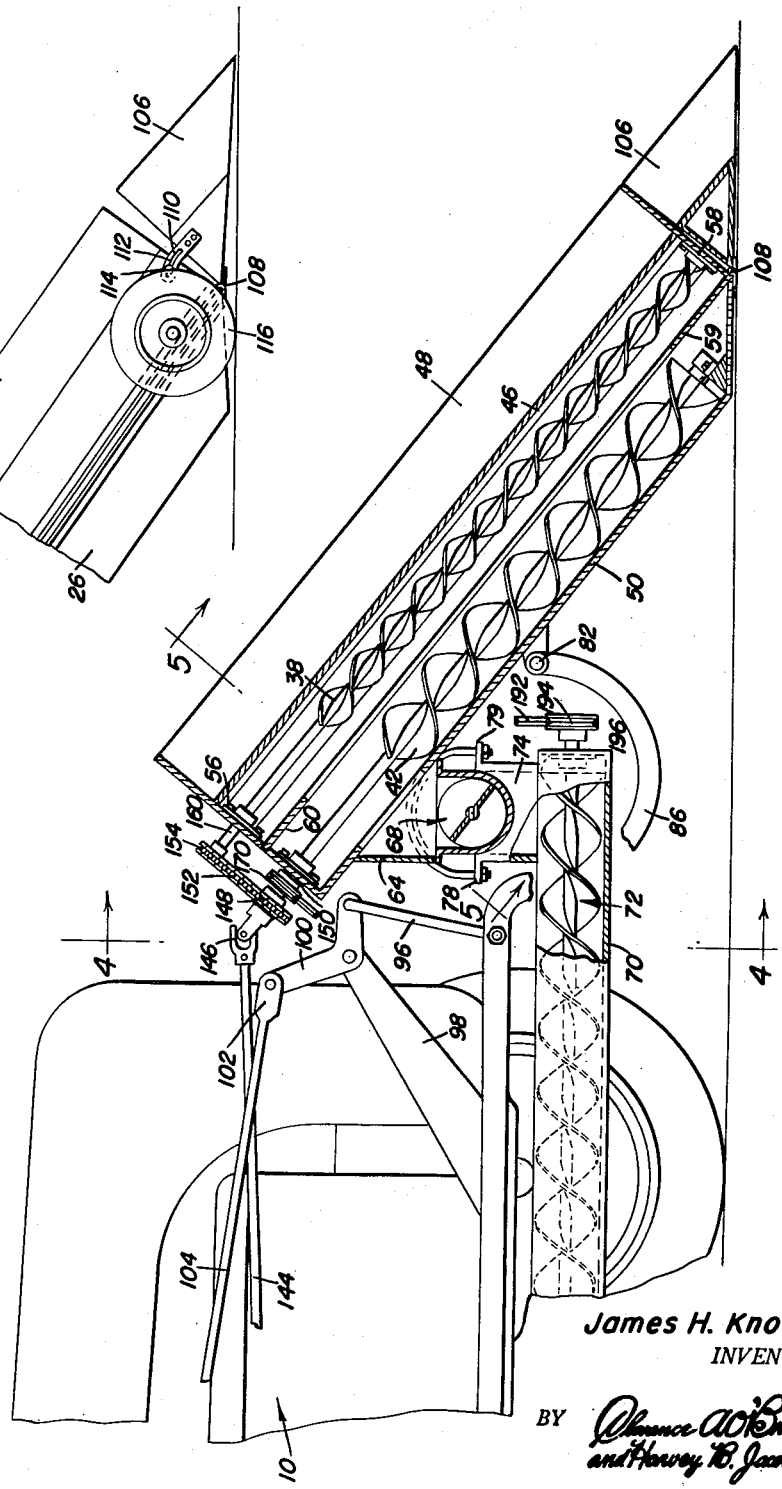
James H. Knowles
INVENTOR.
BY Dec. 1, 1953   J. H. KNOWLES   2,660,849
COTTON HARVESTER
Filed Aug. 25, 1950   5 Sheets-Sheet 4
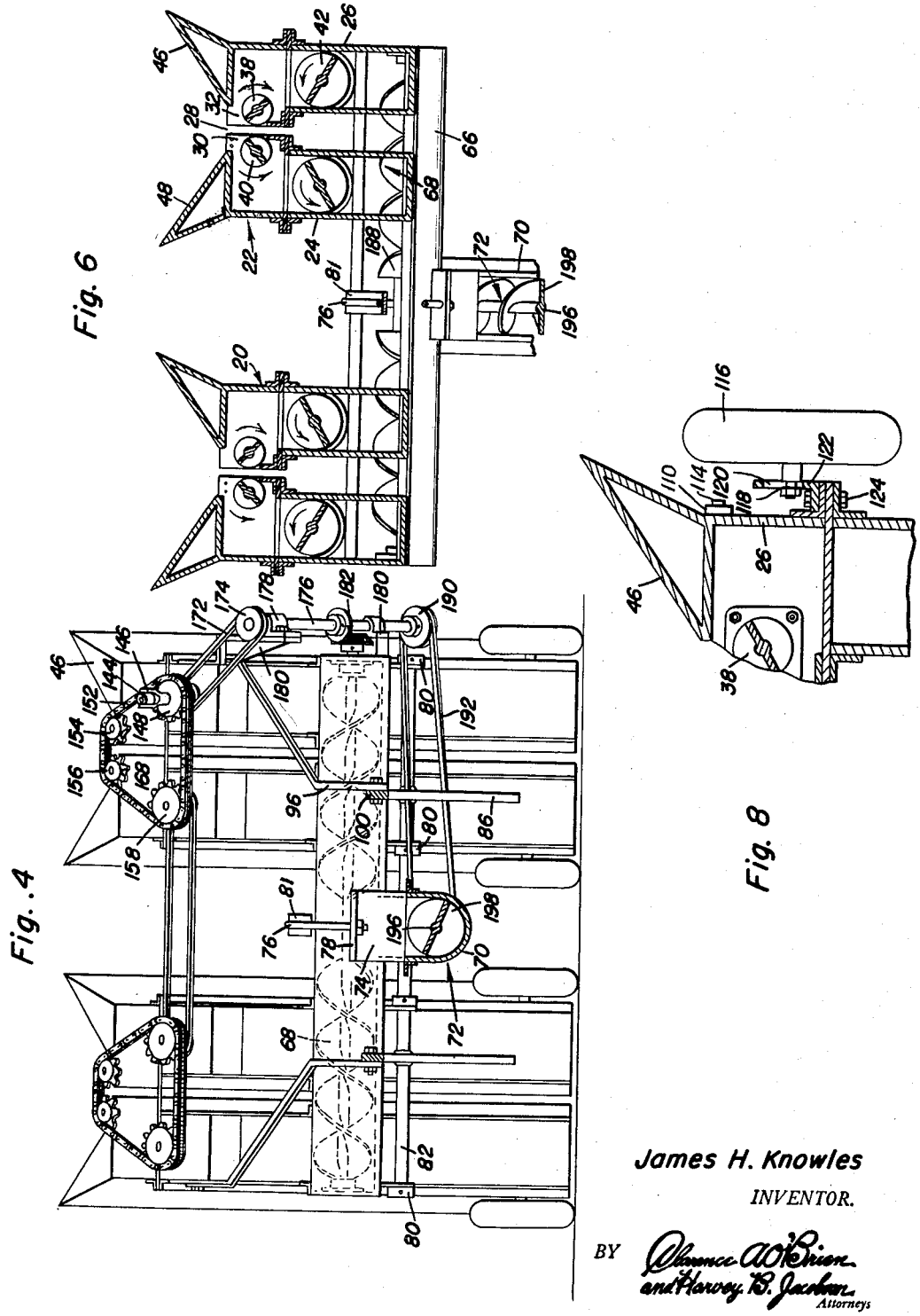
James H. Knowles
INVENTOR.

Dec. 1, 1953   J. H. KNOWLES   2,660,849
COTTON HARVESTER

Filed Aug. 25, 1950   5 Sheets-Sheet 5

James H. Knowles
INVENTOR.

BY
Clarence A. O'Brien
and Harvey B. Jackson
Attorneys

Patented Dec. 1, 1953

2,660,849

UNITED STATES PATENT OFFICE 2,660,849

COTTON HARVESTER

James H. Knowles, Tulia, Tex.

Application August 25, 1950, Serial No. 181,438

4 Claims. (Cl. 56—33)

This invention relates to improvements in farm implements.

An object of this invention is to provide an improved cotton harvester, the harvester making it possible to increase the quality of yield of a cotton field by shearing the cotton bolls from their stems as opposed to pulling them from the stalks and by collecting the loose cotton from the cotton plants, which would ordinarily be lost or not nearly so successfully collected.

A further object of this invention is to provide a unit at the front of a tractor, said unit consisting of two assemblies, each assembly comprising a case having a longitudinally extending entrance opening therein and a combination device disposed in the opening, the combination device consisting of a shearing auger which operates in conjunction with a stationary cutter bar, whereby the auger not only shears the cotton bolls from the stems but also directs them into the case with which the cutting auger is connected for further conveyance by a series of conveyors.

A further object of this invention is to provide an improved assembly as described which is so arranged as to be capable of pivotal movement about a horizontal axis, the pivotal assembly being connected with a longitudinal conveyor carried by a tractor and operated preferably by motive force derived from the tractor.

A further object of this invention is to provide at least two cases in side by side relationship which are spaced from each other to provide a passageway for the cotton plants, each case having an opening therein which is in confronting relationship with the other opening, and a cutting device, for example an auger which cooperates with a stationary cutter bar for the purpose of shearing cotton bolls from their stems, and to incorporate therewith a mechanism or arrangement of mechanical parts which is capable through slight adjustment to actuate the augers either in one direction or in another direction depending upon which operation is desired that is whether the cotton bolls are to be sheared from their stems or whether the loose cotton is to be collected and flipped into the bottom of the case for subsequent conveyance.

A still further object of this invention is to provide a shield to be used for partially closing one of the openings in one of the cases so that the cotton bolls are directed inwardly toward the auger in the other case to thereby increase the efficiency of operation of the device.

Ancillary objects and features of importance will become apparent in following the description of the illustrated form of the invention.

In the drawings:

Figure 1 is an elevational view of the device showing it attached to a tractor;

Figure 2 is a plan view of the device of Figure 1 in enlarged scale, the rear portion thereof being omitted;

Figure 3 is a sectional view taken substantially on the line 3—3 of Figure 2 and in the direction of the arrows;

Figure 4 is a transverse sectional view taken substantially on the line 4—4 of Figure 3 and in the direction of the arrows;

Figure 5 is an enlarged sectional view taken substantially on the line 5—5 of Figure 3 and in the direction of the arrows;

Figure 6 is a sectional view somewhat similar to that of Figure 5, the rotation of the cutting augers being different and illustrated as such in Figure 6;

Figure 7 is a fragmentary elevational view of the lower part of one of the casings showing a guide at the front thereof;

Figure 8 is a fragmentary sectional view of the front of one of the cases taken substantially on the line 8—8 of Figure 2 and illustrating particularly the vertical adjustment of one of the wheels therefor.

Figure 9:
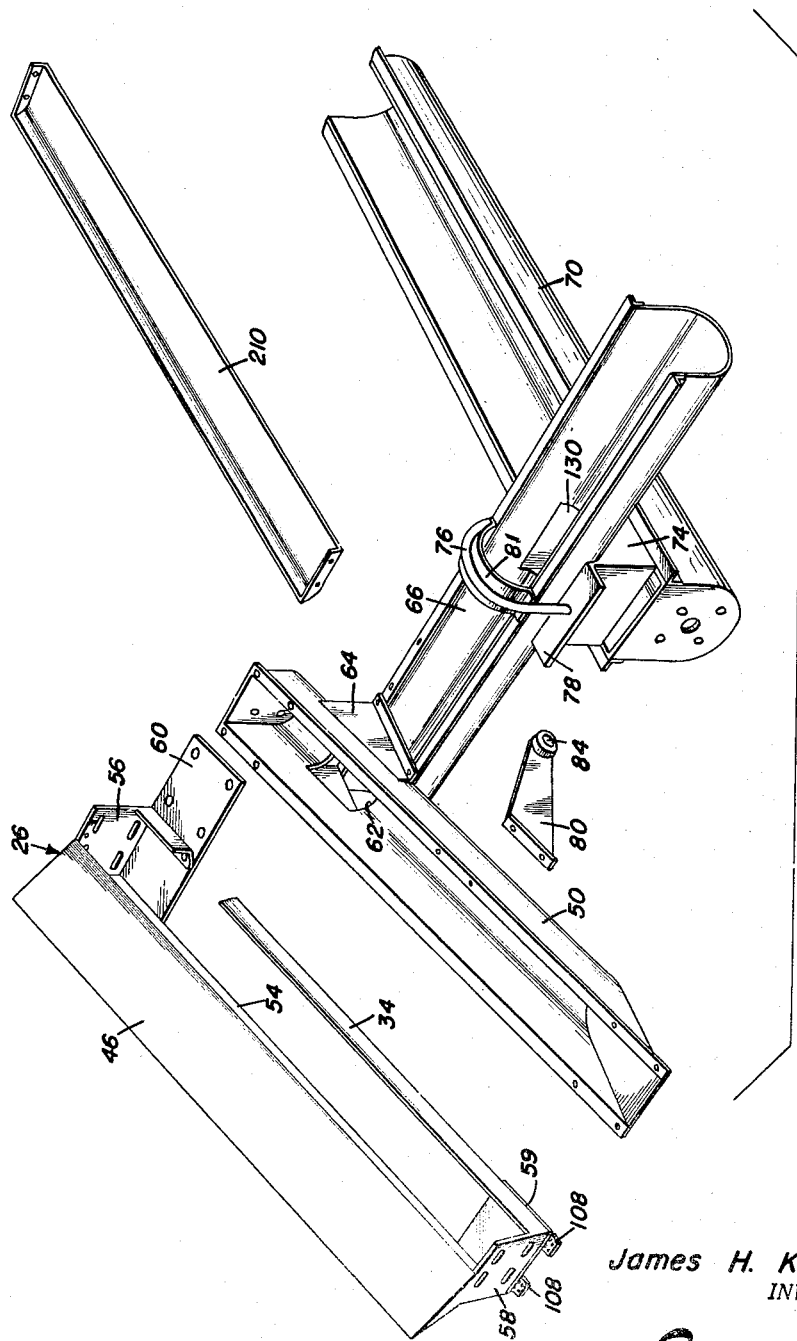
Figure 9 is an exploded perspective view of some of the parts forming one of the cases and a part of the conveyor system of the device.

In carrying out this invention there is a conventional tractor illustrated generally at 10 and consisting of various conventional elements such as the lift arms 12, drawbar 14 and power take-off pulley 16. Mounted at the rear of the drawbar by a conventional coupling is a cart fragmentarily shown at 17. This cart may be employed as the final repository for the cotton after it is harvested. Other means of collection may be resorted to as found desirable and conventional.

Attention is now invited to Figure 2. There is a pair of units 20 and 22 respectively disposed at the front of the tractor 10. The unit 22 is substantially identical to unit 20, the only difference being that one is adapted for one side of the tractor while the other is adapted for the other side insofar as mechanical, structural detail is concerned.

As disclosed in Figure 5 the unit 22 consists of two cases 24 and 26 respectively which are arranged in side by side relationship but which are spaced slightly from each other to thereby provide a passage or passageway 28 through which cotton plants are adapted to pass when the tractor is moved through a cotton field. The actual means for holding the two cases in spaced relationship will be described subsequently. The case or casing 24 is provided with a laterally opening entrance or opening 30, while there is a similar entrance or opening 32 in the case 26 which confronts the opening 30. A stationary cutter bar, in the form of an angle iron 34 in the illustrated instance, is disposed in the entrance 32, while a fixed cutter 36 of similar construction is disposed in the opening 30. These fixed cutters are employed for cooperation with the movable or rotary cutters 38 and 40. The rotary or movable cutters serve a number of functions. They are structurally in the form of small augers which contact the fixed cutter bars 34 and 36 or which are arranged very close to them. The first function of the cutters is to shear cotton bolls from their stems. The second function is to flip loose cotton, known as storm cotton, from the cotton plants into the lower part of the cases 24 and 26, when the conveyors 42 and 44, which are obviously of the auger type, convey the cotton away, the rotary cutters 38 and 40 and their respective cutter bars 34 and 36 forming combination cutter and cotton boll displacing assemblies.

Baffles or guides 46 and 48 are formed as a part of the case 26 and 24 in order to direct the cotton plants, leaves and stems as well as branches into the passageway 28 so that the cotton bolls or the cotton may be removed from the plants.

The conveyors 42 and 44 are arranged in troughs 50 and 52 which form parts of the cases 26 and 24. Attention is now invited to Figure 9. The guide 46 is shown as being connected with the upper shell 54 of the case 26. This shell has two end walls 56 and 58, each of which is provided with a number of slots in order to accommodate bearing plates for supporting the cutter 38. The fixed or stationary cutter bar 34 is disposed on the lower end plates 59 and 60, one of which is sufficiently long to support another shell similar to the shell 54 which forms a part of the case 24 which is not illustrated in Figure 9.

The trough 50 is disposed below the open bottom or substantially open bottom of the shell 54 and is bolted or otherwise rigidly fixed to the plates 59 and 60.

A discharge opening 62 is provided in the bottom of the trough 50 and a neck or sleeve connector 64 is arranged in communication therewith. The connector 64 is also secured to a transverse trough 66 which forms a part of a transverse conveyor 68 (Figure 5) adapted to collect and convey cotton from the two cases in the assembly 22 and the two cases in the assembly 20.

Means forming a bearing for the trough 66 is provided on a longitudinal trough 70 which forms a part of a longitudinal conveyor 72, which is fixed rigidly to the tractor, as by the bracket assembly 73 (Figure 1) which is also connected with the tractor drawbar 14.

The bearing assembly consists of a vertical tube 74 which may be of any shape desired which has an arcuate cap 76 secured thereto, preferably by fastening to the laterally projecting flanges 78 and 79. A wear plate 81 is fixed to the transverse trough 66 and is adapted to bear against the arcuate cap 76. Through this construction the cases, and transverse conveyor 68 may be rotated about a horizontal axis and in the bearing assembly, specifically in the cradle formed in the vertical tube 74.

Each case has a bracket 80 secured thereto by suitable means, for example rivets or bolts. A transverse shaft 82 is passed through the bearings 84 of the brackets 80 and is used for the purpose of transmitting motion from the arms 86 and 88 to pivotal movement of the cases and transverse conveyor 68 for adjustment purposes. These arms are pivoted, as at 90 (Figure 1) to a structural part of the tractor 10 and have lifting links 96 connected with each. Each lifting link is provided with an identical means of applying force to it (see Figure 3). A support 98 is fixed to a part of the tractor and has a crank 100 at one end thereof. One end of the crank is secured to the lifting link 96, while the other end thereof is secured to the bifurcations 102 of the push rod 104. This push rod is connected to the lift arm 12 of the tractor, whereby upon manipulation of conventional tractor controls, the push rod 104 is operated to thereby raise or lower the lift arm 86 to pivot the cases in the bearing assembly seen in Figure 9. This provides an adjustment for the attachment at the front of the tractor.

Attention is now invited to Figure 3 and Figure 7. A vertically tapered guide 106 is pivoted, as by means of the hinges 108 to the front part of each case. This guide or shoe is adapted to direct the plants into the passageway 28 for operation on the plants by the cutters. The guide is adjustable as disclosed in Figure 7. There is a strap 110 fixed to the guide 106 and there is an elongated and curved slot 112 formed therein through which a bolt 114 passes. This bolt is secured to the lower end of the case 26, illustrated in Figure 7, whereby the angle of approach of the guide 106 may be regulated in accordance with the prerogative of the user of the device.

At the left and the right side of the device there is a wheel to support the front end of the entire assembly. The wheel 116 for one side of the attachment is mounted on a spindle 118 which is passed through a slot 120 formed in the spindle support 122. This spindle support is fixed, for example by means of a number of bolts 124 to the case 26 at an appropriate place. By means of employing the nut at the end of the spindle 118 the spindle may be loosened and then raised or lowered so that the wheel 116 may be adjusted to the selected desired elevation.

There is an opening 130 formed in the trough 66 so that the contents of the trough may be discharged into the tube 74 for subsequent deposit into the longitudinal conveyor 72. After it is deposited in the longitudinal conveyor, which is preferably in the form of an auger, it is carried to the rear of the tractor until it is elevated by means of a suction pump 132 and deposited in the cart 16 through the piping 134.

Reference is now made to Figures 1 and 2 for a description of how the various conveyors and cutters are operated. Power is derived from the power take-off pulley 18 and transmitted to the lay shaft 136 which is mounted in bearings 137 and 138 on the tractor. A conventional belt 139 is entrained around the pulley 18 and also around a pulley 140 which is fixed at one end of the lay shaft 136. There is a universal joint 142 at the opposite end of the lay shaft in order to connect the telescopingly arranged shafting 144 thereto. The outer end of the telescopingly arranged shafting 144 has a universal joint 146 connected therewith to which is attached the sprocket 148. This sprocket is mounted on a shaft 150 which is an extension of the auger shaft 42. Accordingly, the auger 42 is caused to be operated by this expedient. There is a chain 152 entrained around the sprocket 148, the sprocket 154, the sprocket 156 and finally the sprocket 158. The sprocket 154 is fixed to the shaft 160 which forms an extension of the cutter 38, while the sprocket 156 is fixed to the shaft 166 which forms an extension of the cutter 40. The sprocket 158 is fixed to a shaft 168 which forms an extension of the auger 44 shaft. Accordingly through this chain of mechanical elements all of the augers in one assembly, for example the assembly 22 are caused to be operative. Moreover, the cutters 38 and 40 are caused to be operated in the direction of rotation as indicated by the arrows in Figure 5.

There is a pulley 170 fixed to the shaft 150 and a belt 172 is entrained therearound and also around a pulley 174. The pulley 174 is connected to the shaft 176 which is mounted in bearings 178 on the hangers 180 (Figure 2) which are in turn connected to the case 26. The shaft 176 has a bevel gear assembly 182 connected therewith, that is, there is one bevel gear fixed to the shaft 176 and another bevel gear mesh therewith which is attached to the shaft 184. The shaft 184 forms a part of the auger 188 which is disposed in the trough 66 and which forms a part of the transverse conveyor 68. Through this expedient the transverse conveyor 68 obtains its motive force.

The lower end of the shaft 176 is provided with a pulley 190 which has a belt 192 disposed therearound. This belt is also disposed around a pulley 194 which is fixed to the shaft 196, forming a part of the auger 198 (Figure 5). The auger 198 is the preferable element forming a part of the longitudinal conveyor 72. It is in this way that the longitudinal conveyor derives its rotative action.

In order to synchronize the movement of the various augers in the assembly 20, a belt 199 is entrained around the pulleys 200 and 202 respectively. These pulleys are fixed to the shaft 168 and the corresponding shaft of the assembly 20 that is, the shaft which extends from one end of the auger conveyor in one of the cases of the assembly 20. If a direct and synchronized movement between both assemblies 20 and 22 is desired, sprockets may be employed in lieu of the pulleys 200 and 202 and of course, a chain will take the place of the belt 199.

As previously described with reference to Figure 5 the cutters or cutter augers 38 and 40 will be caused to be operated in the direction as disclosed by the arrows in that figure. Under some conditions of operation it has been found desirable and to my knowledge and advance in the art to rotate one auger type cutter, for example the one indicated at 38 in a direction opposite from the rotation of the auger 40 as shown in Figure 6. In other words, while one of the augers is rotating in a clockwise direction, the other is rotating in a counter-clockwise direction. Under these conditions the cotton which has been separated from the bolls and which has been dislocated, for example disposed within the leaves of the plants, is gathered by flipping it from the plants and leaves into the conveyors 42 and 44. The action of the cotton is that it is thrown upwardly and over the augers 38 and 40. It will be noted in correlating Figures 5 and 6 that there is a cover 210 arranged in the opening 30, partially closing it, while there is no cover employed in Figure 6. When the augers are rotated as disclosed in Figure 5 the cover serves the purpose of guiding the cotton plants through the passage and crowding the cotton bolls into the path of travel of the cutting auger 38. The cover 210 urges the cotton bolls toward the auger 38, that is, toward the entrance 32 which is opposite from that one which is partially closed by the cover 210.

In operation the tractor 10 is moved through a cotton field with the cotton plants being guided by means of the guides 106 into the entrance 28 for the assembly 22 and in a similar manner in connection with the assembly 20. By having the chain 152 which extends around the sprockets in the disposition disclosed in Figure 2, the augers or rotary cutters 38 and 40 will operate in the directions disclosed in Figure 5 by the arrows. Accordingly the cotton bolls will be sheared by the action of the cutter 38 operating in conjunction with the stationary or fixed cutter 34. Then, the cotton bolls after being sheared from their stems, are dropped or caused to fall due to gravity into the conveyor 42. They fall through the opening 66 in the trough 50 into the transverse conveyor 68. Thereafter, due to the action of the auger 188 therein (one half being threaded left and the other half being threaded right) the cotton bolls are dropped through the tube 74 into the conveyor 72, whence they are picked up by the tubing 134 through the action of the pump 132.

When it is desired to operate the device with the cover 210 removed, each cover that is, the cover 210 from the assembly 22 and the cover from the assembly 20, is removed inasmuch as they are held in place by simple bolts, and the chains 152 are removed. The chains are then replaced but in a different manner. Reference is now made to Figure 2. The chain 152, after being shortened through the removal of links, is replaced around the sprocket 148, the sprocket 158 and the sprocket 156 in the same manner as it was removed. But, the chain instead of being entrained over the sprocket 154 is entrained under it. This will cause the sprocket 154 to operate in a direction opposite from the sprocket 156 and will thereby cause operation of the cutting augers 38 and 40 in the directions disclosed in Figure 6. By this action the storm cotton is gathered in the manner previously described and it is subsequently conveyed by the various conveyors as disclosed and described previously.

When it is desired to adjust the guides 106 they are manually adjusted in the manner discussed previously. In order to raise or lower the entire device at the front end of the tractor about a horizontal axis, the push rod 104 is operated by the tractor derived motive force.

Having described the invention, what is claimed as new is:

1. A cotton harvesting machine comprising a pair of cases, each having a laterally arranged cotton boll entrance opening therein, means holding said cases spaced from and substantially parallel to each other to thereby provide a cotton plant passage between the cases, said entrance openings facing each other, a cutting auger carried by each case and disposed in each opening, a stationary cutting bar carried by each case in its opening and cooperating with said augers to shear the cotton bolls from the stems of the cotton plants, and means carried by said cases for rotating said augers selectively in opposite directions to shear the bolls from their stems and flip the loose cotton from the plants.

2. A cotton harvesting machine comprising a pair of cases, each having a laterally arranged cotton boll entrance opening therein, means holding said cases spaced from and substantially parallel to each other to thereby provide a cotton plant passage between the cases, said openings facing each other, a cutting auger carried by each case and disposed in each opening, a stationary cutting bar carried by each case in its opening and cooperating with said augers to shear the cotton bolls from the stems of the cotton plants, means carried by said cases for rotating said augers selectively in opposite directions to shear the bolls from their stems and flip the loose cotton from the plants, and conveyors in said cases to move the sheared and flipped material from beneath said augers.

3. A cotton harvesting machine comprising a pair of cases, each having a laterally arranged cotton boll entrance opening therein, means holding said cases spaced from and substantially parallel to each other to thereby provide a cotton plant passage between the cases, said entrance openings facing each other, a cutting auger carried by each case and disposed in each opening, a stationary cutting bar carried by each case in its opening and cooperating with said augers to shear the cotton bolls from the stems of the cotton plants, and means carried by said cases for rotating said augers selectively in opposite directions to shear the bolls from their stems and flip the loose cotton from the plants, conveyors in said cases to move the sheared and flipped material from beneath said augers, and a removable cover disposed over a part of one of said openings to guide the cotton plants through said passage and to crowd the cotton bolls into the path of travel of the cutting auger in the other opening.

4. The combination of claim 3 and each of said cases having a guide at the front end thereof, and means carried by said cases and guides for retaining said guides in selected adjusted positions.

JAMES H. KNOWLES.

References Cited in the file of this patent

UNITED STATES PATENTS

| Number | Name | Date |
|---|---|---|
| 2,123,405 | Court | July 12, 1938 |
| 2,299,384 | Day | Oct. 20, 1942 |
| 2,406,058 | Boone | Aug. 20, 1946 |
| 2,445,162 | Wallace | July 13, 1948 |
| 2,451,130 | Townsend | Oct. 12, 1948 |
| 2,491,777 | Smith | Dec. 20, 1949 |
| 2,532,065 | Hyman | Nov. 28, 1950 |